United States Patent
Kogure

(10) Patent No.: US 10,694,058 B2
(45) Date of Patent: Jun. 23, 2020

(54) IMAGE FORMING APPARATUS THAT OUTPUTS AN OPERATION SCREEN OF AN EXTENSION APPLICATION WITH PART OF AN OPERATION SCREEN OF A NATIVE PROGRAM CONTROL METHOD THEREFOR, AND STORAGE MEDIUM

(71) Applicant: CANON KABUSHIKI KAISHA, Tokyo (JP)

(72) Inventor: Takeshi Kogure, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/660,058

(22) Filed: Jul. 26, 2017

(65) Prior Publication Data

US 2018/0048776 A1    Feb. 15, 2018

(30) Foreign Application Priority Data

Aug. 9, 2016  (JP) .................................. 2016-156859

(51) Int. Cl.
*G06F 3/12* (2006.01)
*H04N 1/00* (2006.01)

(52) U.S. Cl.
CPC ..... *H04N 1/00503* (2013.01); *H04N 1/00411* (2013.01); *H04N 1/00506* (2013.01); *H04N 1/00941* (2013.01); *H04N 1/00952* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2003/0215256 A1* | 11/2003 | Osada | ................ | G03G 15/5016 399/81 |
| 2009/0021780 A1* | 1/2009 | Sato | ................... | H04N 1/00347 358/1.15 |
| 2009/0080013 A1* | 3/2009 | Sato | ................... | H04N 1/00204 358/1.15 |
| 2010/0007916 A1* | 1/2010 | Ikeda | ................. | H04N 1/00347 358/1.15 |
| 2013/0185712 A1* | 7/2013 | Osada | ..................... | G06F 9/445 717/174 |
| 2015/0067671 A1* | 3/2015 | Kamiya | ..................... | G06F 8/61 717/174 |

FOREIGN PATENT DOCUMENTS

JP       2014-075088 A      4/2014

* cited by examiner

*Primary Examiner* — Henok Shiferaw
(74) *Attorney, Agent, or Firm* — Venable LLP

(57) ABSTRACT

A present image forming apparatus includes a first control unit that controls a native program, a second control unit that controls an extension application different from the native program, a first memory area in which an operation screen of the native program controlled by the first control unit is rendered, and a second memory area in which an operation screen of the extension application controlled by the second control unit is rendered. At least a part of the operation screen of the native program is output to a display when an event related to outputting of the operation screen of the native program has occurred while the display is displaying a screen rendered in the first memory area.

12 Claims, 15 Drawing Sheets

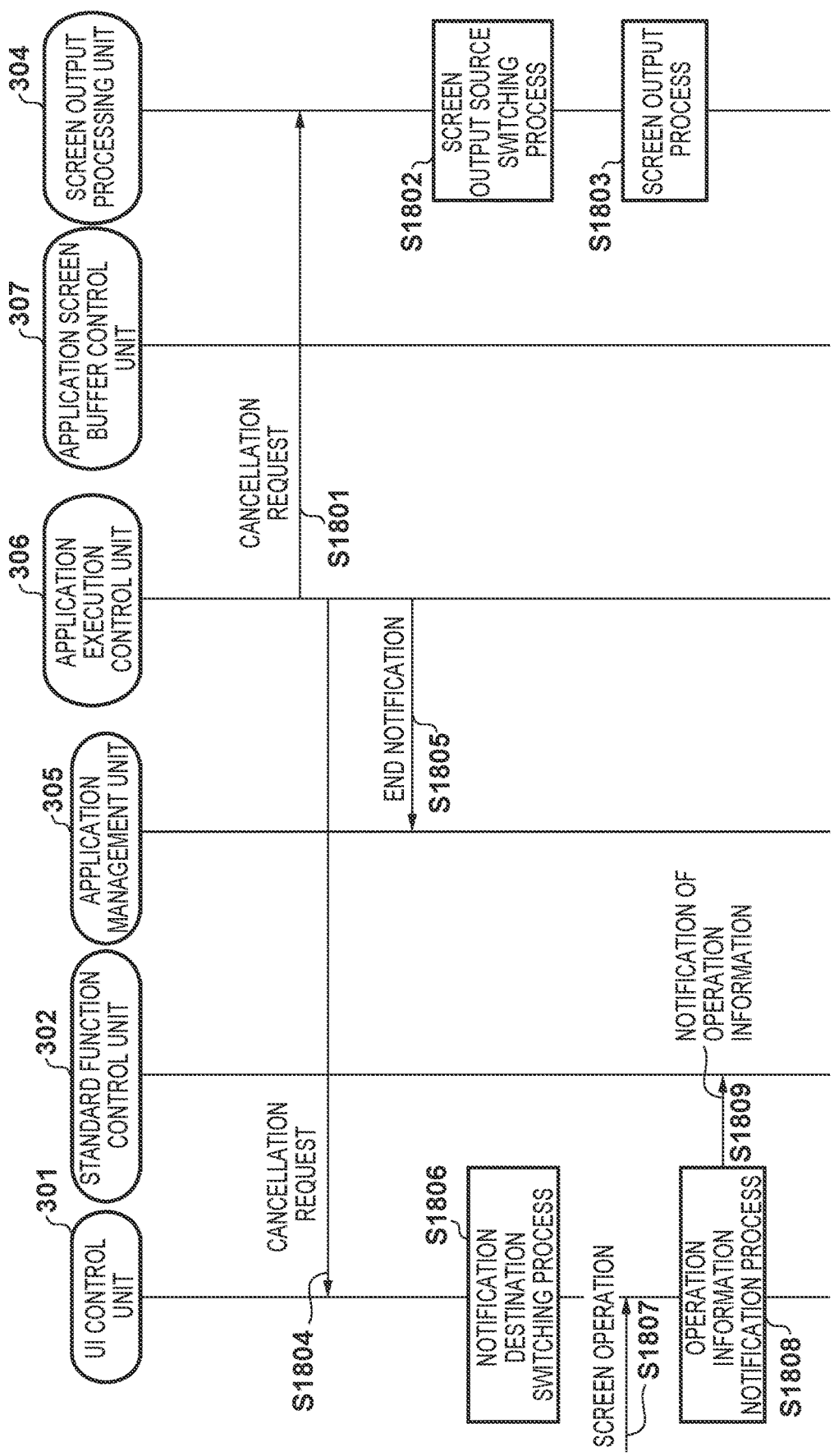

IMAGE FORMING APPARATUS THAT OUTPUTS AN OPERATION SCREEN OF AN EXTENSION APPLICATION WITH PART OF AN OPERATION SCREEN OF A NATIVE PROGRAM CONTROL METHOD THEREFOR, AND STORAGE MEDIUM

BACKGROUND OF THE INVENTION

Field of the Invention

The present invention relates to an image forming apparatus, a control method therefor, and a storage medium.

Description of the Related Art

Systems that can expand the functions of an image forming apparatus by installing extension applications in the image forming apparatus are widespread. These systems have an execution environment that causes the extension applications to operate by adding in expanded programs separately from control applications of the image forming apparatus. Japanese Patent Laid-Open No. 2014-75088 suggests a technique that realizes exporting and importing of setting information of expanded programs using a portable storage medium.

However, the foregoing conventional technique has the following problem. There is a known method of installing a window manager to enable coexistence of a UI for operating standard functions of an image forming apparatus, such as copying, and a UI for operating expanded functions. Realization of such a window manager requires consumption of a large amount of hardware resources, such as a high-speed CPU, GPU, and memory. However, in an image forming apparatus with limited resources, it is difficult to enable coexistence of an UI for operating standard functions and a UI for operating expanded functions, and convenience of users has been impaired.

SUMMARY OF THE INVENTION

One aspect of the present invention provides an image forming apparatus, comprising: a display; a first control unit configured to control a native program of the image forming apparatus; a second control unit configured to control an extension application that is different from the native program; a first memory area in which an operation screen of the native program controlled by the first control unit is rendered; a second memory area in which an operation screen of the extension application controlled by the second control unit is rendered; and an output processing unit configured to output at least a part of the operation screen of the native program to the display when an event related to outputting of the operation screen of the native program has occurred while the display is displaying a screen rendered in the first memory area.

Another aspect of the present invention provides a control method for an image forming apparatus that includes a display, a first control unit configured to control a native program of the image forming apparatus, and a second control unit configured to control an extension application that is different from the native program, the control method comprising: rendering, in a first memory area, an operation screen of the native program controlled by the first control unit; rendering, in a second memory area, an operation screen of the extension application controlled by the second control unit; and outputting at least a part of the operation screen of the native program to the display when an event related to outputting of the operation screen of the native program has occurred while the display is displaying a screen rendered in the first memory area.

Still another aspect of the present invention provides a non-transitory computer-readable storage medium storing a computer program for causing a computer to execute processes of a control method for an image forming apparatus that includes a display, a first control unit configured to control a native program of the image forming apparatus, and a second control unit configured to control an extension application that is different from the native program, the control method comprising: rendering, in a first memory area, an operation screen of the native program controlled by the first control unit; rendering, in a second memory area, an operation screen of the extension application controlled by the second control unit; and outputting at least a part of the operation screen of the native program to the display when an event related to outputting of the operation screen of the native program has occurred while the display is displaying a screen rendered in the first memory area.

Further features of the present invention will be apparent from the following description of exemplary embodiments with reference to the attached drawings.

BRIEF DESCRIPTION OF THE DRAWINGS

FIG. 18 is a sequence diagram showing processes that are executed when an application is ended in the embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Configuration of Image Forming Apparatus>

Figure 1:
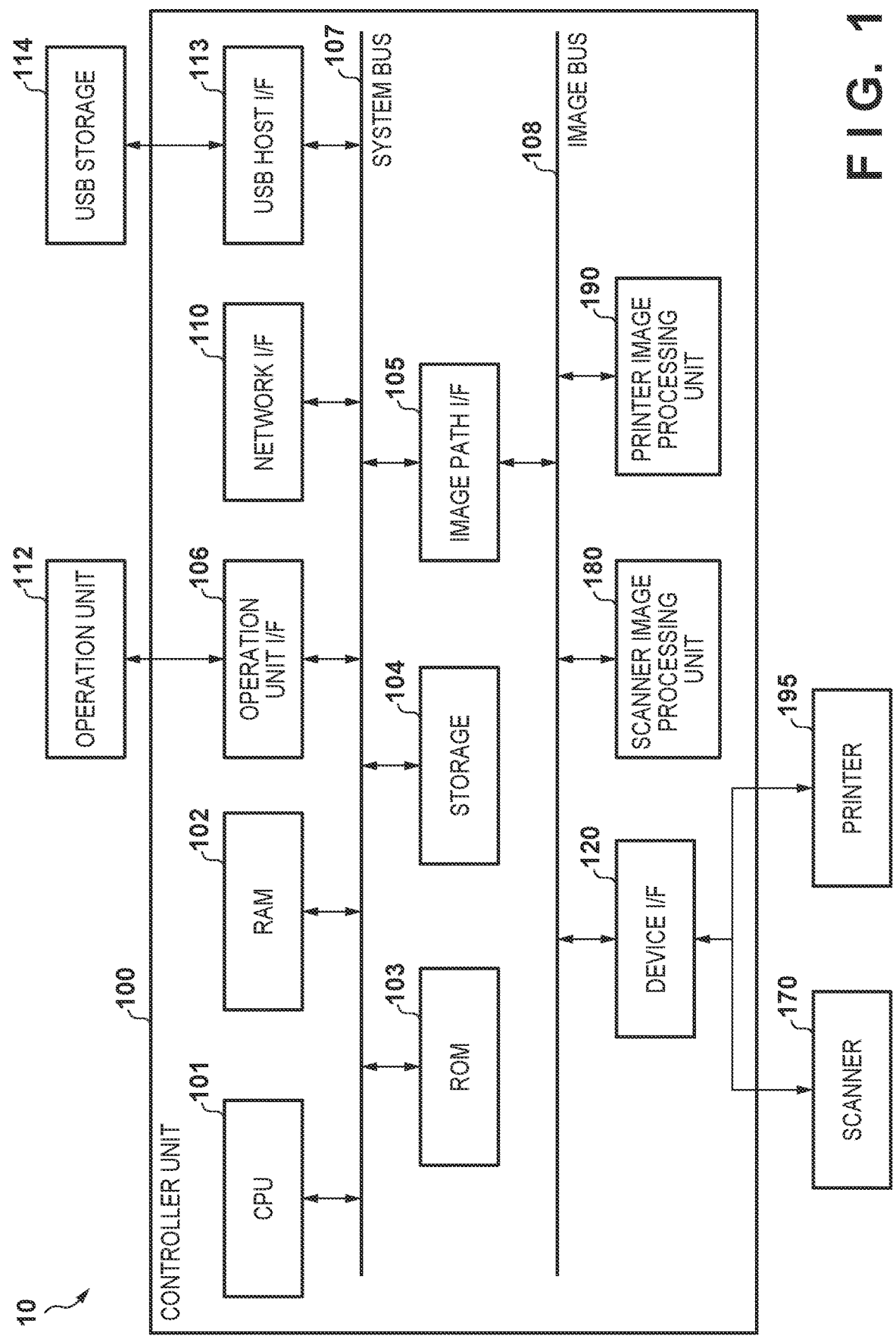
FIG. 1 shows hardware configurations of an image forming apparatus 10 according to an embodiment.

The following describes a first embodiment of the present invention. First, with reference to FIG. 1, exemplary configurations of main components of an image forming apparatus will be described.

An image forming apparatus 10 includes a controller unit 100, an operation unit 112, a scanner 170, and a printer 195. A USB storage 114 is attachable to and removable from the image forming apparatus 10. The controller unit 100 includes a CPU 101, a RAM 102, a ROM 103, a storage 104, an image path I/F 105, an operation unit I/F 106, a network I/F 110, and a USB host I/F 113. These components are connected via a system bus 107. The controller unit 100 also includes a device I/F 120, a scanner image processing unit 180, and a printer image processing unit 190. These components are connected via an image bus 108. Note that the image path I/F 105 is connected to both the system bus 107 and the image bus 108.

The controller unit 100 performs control to realize a copy function that causes a printer 195 to output a printout of image data read by the scanner 170. The CPU 101 starts up an operating system (OS) using a boot application stored in the ROM 103. The CPU 101 executes various types of processes by executing applications stored in the storage 104 on the OS. The RAM 102 is used as a working area for the CPU 101. The RAM 102 provides the working area, as well as an image memory area for temporarily storing image data. The storage 104 stores applications and image data.

The operation unit I/F 106 is an interface with the operation unit 112 that includes a touchscreen, and outputs image data to be displayed on the operation unit 112 to the operation unit 112. The operation unit I/F 106 also transmits, to the CPU 101, information that has been input by a user via the operation unit 112. The network I/F 110 is an interface for connecting the image forming apparatus 10 to a LAN.

The USB host I/F 113 is an interface unit that communicates with the USB storage 114. The USB host I/F 113 is an output unit for causing the USB storage 114 to store data stored in the storage 104. The USB host I/F 113 also conveys data stored in the USB storage 114 to the CPU 101 by inputting the data thereto. The USB storage 114 is an external storage apparatus that stores data, and is attachable to and removable from the USB host I/F 113. A plurality of USB devices, including the USB storage 114, are connectable to the USB host I/F 113.

The image path I/F 105 is a bus bridge intended to connect the system bus 107 and the image bus 108, which transfers image data at high speed, and to convert a data format. The image bus 108 is constituted by, for example, a PCI bus or an IEEE 1394 bus. The scanner 170 and the printer 195 are connected to the device I/F 120, and the device I/F 120 applies synchronous/asynchronous conversion to image data. The scanner image processing unit 180 applies correction, processing, and editing to input image data. The printer image processing unit 190 applies correction, resolution conversion, and the like to image data to be output as a printout in accordance with the printer 195.

<Extension Applications>

Figure 2:
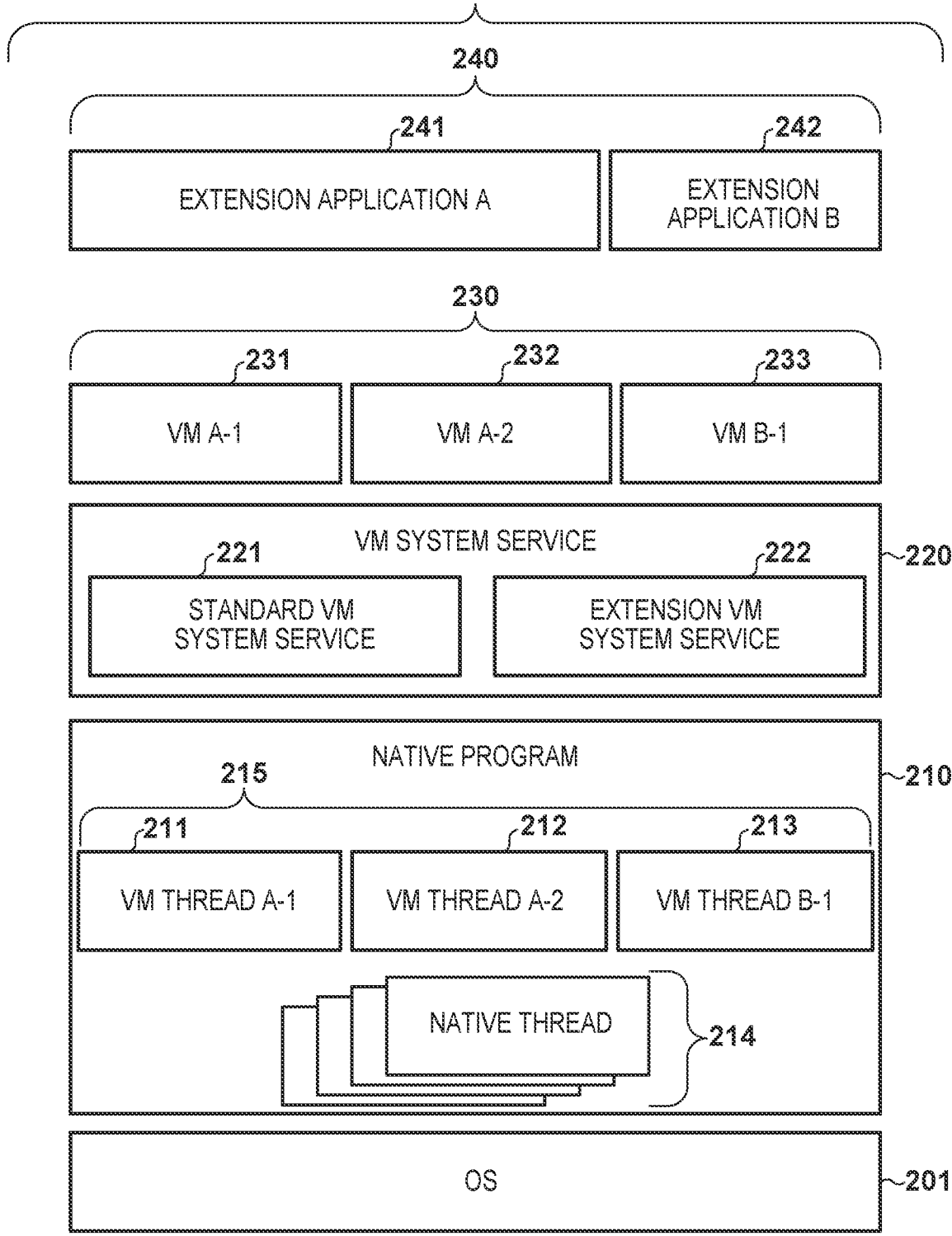
FIG. 2 shows software configurations related to execution environments for extension applications of the image forming apparatus 10 according to the embodiment.

With reference to FIG. 2, a description is now given of exemplary execution environments for extension applications of the image forming apparatus 10. Herein, the extension applications refer to applications for providing expanded functions other than standard functions. Modules shown in FIG. 2 are realized by the CPU 101 loading applications stored in the storage 104 to the RAM 102 and executing the loaded applications.

A native program 210 for controlling the printer, a FAX machine, the scanner, and other image processing units, as well as virtual machines (VMs) 230 that serve as execution environments for the extension applications, operate on an operating system (OS) 201. The VMs 230 are modules for comprehending and executing applications that control the extension applications. The extension applications always operate on the VMs 230. The VMs 230 according to the present embodiment are software modules that operate on the CPU 101; alternatively, they may be hardware modules. The VMs are interpreters, and may be Java®. In a case where the VMs are bytecode interpreters, the VMs may be, for example, systems that interpret Lua, which is a scripting language.

The native program 210 includes native threads 214 for controlling the printer, the FAX machine, the scanner, and other image processing units, and VM threads 215 for causing the virtual machines 230 to operate. The number of the VM threads is the same as the number of the VMs 230. Herein, three VM threads 211, 212, and 213 have been generated. The native program 210 may be constituted as a part of firmware (real-time OS) that directly controls native functions of the image forming apparatus, or as a library called up by the firmware. This library may be constituted as a group of control programs that directly control native functions of the image forming apparatus, such as the C language.

A VM system service 220 is a utility library that is shared by the extension applications. By calling up functions of the VM system service 220 from extension applications 240, the trouble of developing extension applications can be saved, or the modules of the image forming apparatus 10 can be accessed. The VM system service 220 includes a standard VM system service 221 that achieves minimal VM operations, and an expanded VM system service 222 that accesses the modules of the image forming apparatus 10 and provides OS functions.

The VMs 230 execute the extension applications 240. The VMs 230 are generated in one-to-one correspondence with threads of the extension applications. In the example of FIG. 2, the following VMs are generated: VM A-1 231 and VM A-2 232 for causing two threads to operate in an extension application A 241, and VM B-1 233 for causing one thread to operate in an extension application B 242.

On a main menu screen displayed on the operation unit 112 of the image forming apparatus 10, icons that are in one-to-one correspondence with the extension applications are displayed. When the operation unit I/F 106 detects selection of any of the icons by the user via the operation unit 112, the operation unit I/F 106 transmits a notification indicating the detection to the CPU 101. Upon receiving the notification, the CPU 101 activates the extension application selected by the user.

<Software Modules>

Figure 3:
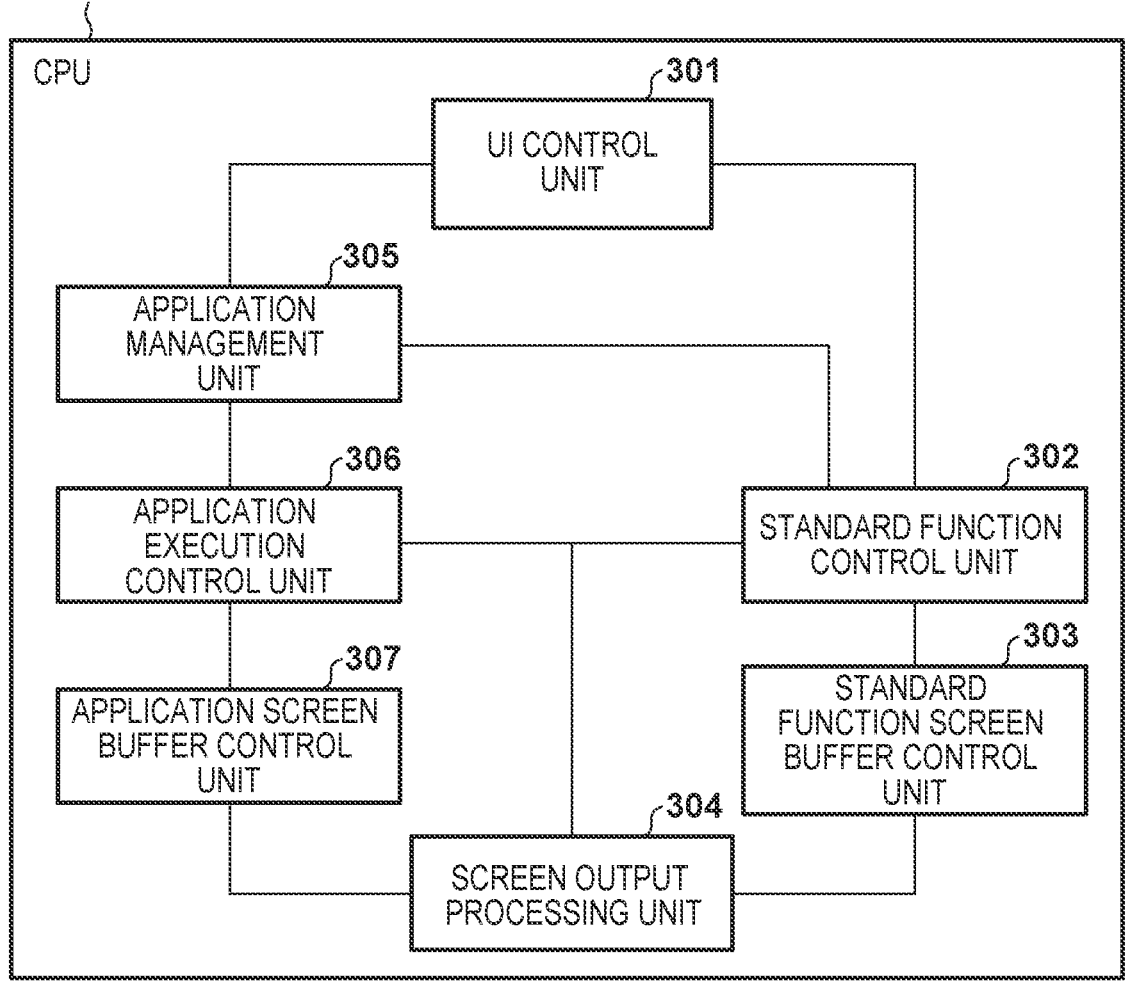
FIG. 3 shows configurations of software modules of the image forming apparatus 10 according to the embodiment.

With reference to FIG. 3, a description is now given of exemplary configurations of software modules that operate on the CPU 101 of the image forming apparatus 10 according to the present embodiment.

The image forming apparatus 10 includes a UI control unit 301, a standard function control unit 302, a standard function screen buffer control unit 303, and a screen output processing unit 304 as software modules. The image forming apparatus 10 also includes an application management unit 305, an application execution control unit 306, and an application screen buffer control unit 307. The UI control unit 301 is a module that detects information of an operation performed by the user via the operation unit 112, and notifies the standard function control unit 302 or the application management unit 305 of the detected operation information depending on the situation.

The standard function control unit 302 functions as a first control unit, and controls the standard functions (native program) of the image forming apparatus 10, such as copy, scan, and FAX functions, based on the operation information notified by the UI control unit 301. This is a module that renders information necessary for user operations via the standard function screen buffer control unit 303, and displays the rendered information on the operation unit 112 via the screen output processing unit 304. It also controls a home screen 400 shown in FIG. 4 for calling up the functions of the image forming apparatus 10, and upon selection of an icon for executing an application (extension application), notifies the application management unit 305 of an application activation request. Herein, the extension applications refer to applications that are different from the native program and that have been installed to provide functions other than the standard functions of the image forming apparatus 10. These extension applications may have already been installed at the time of product shipment of the image forming apparatus, or may be installed after the product shipment.

The standard function screen buffer control unit 303 is a module that functions as a first buffer control unit and controls a screen buffer in which the standard function control unit 302 renders an image. An image rendered in this buffer is displayed on the operation unit 112 via the screen output processing unit 304. The image output processing unit 304 is a module that switches between the standard function screen buffer control unit 303 and the application screen buffer control unit 307 depending on the situation in displaying a buffer on the operation unit 112.

The application management unit 305 is a module that functions as a second control unit, executes a process for activating a designated application upon accepting the application activation request notified by the standard function control unit 302, and notifies the application execution control unit 306 of the operation information notified by the UI control unit 301. The application execution control unit 306 is a module that executes an application designated by the application management unit 305. The application execution control unit 306 also renders an application operation screen via the application screen buffer control unit 307, and displays the rendered application operation screen on the operation unit 112 via the screen output processing unit 304. The application screen buffer control unit 307 is a module that functions as a second buffer control unit and controls a screen buffer in which the application execution control unit 306 renders an image.

<Home Screen>

Figure 4:
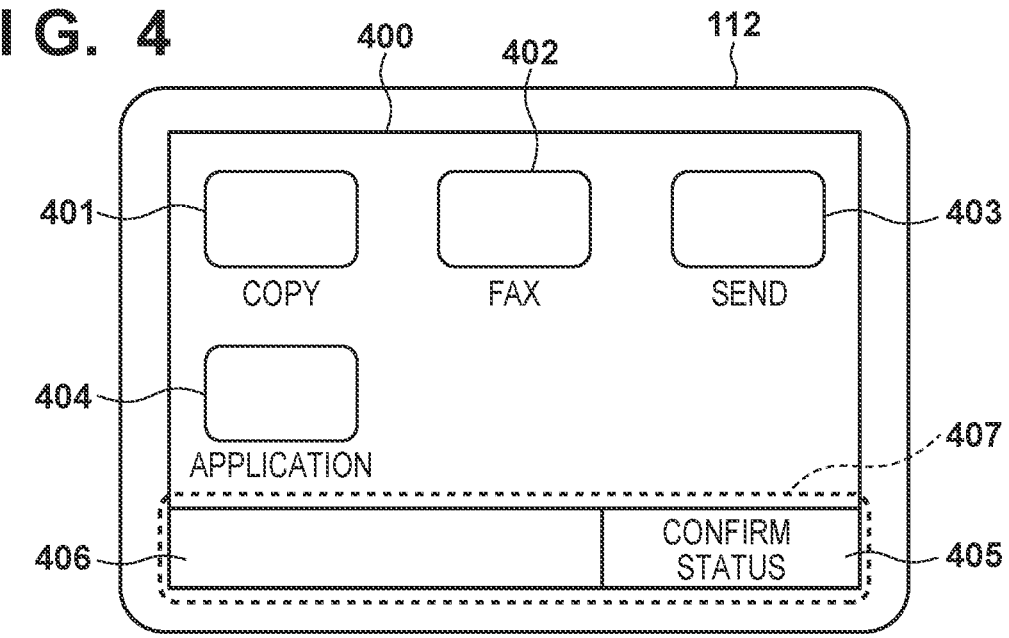
FIG. 4 shows an example of a home screen 400 displayed on an operation unit 112 of the image forming apparatus according to the embodiment.

With reference to FIG. 4, a description is now given of an example of the home screen 400 displayed on the operation unit 112 of the image forming apparatus 10 according to the present embodiment. The home screen 400 is rendered by the standard function control unit 302 via the standard function screen buffer control unit 303, and then output to the operation unit 112 by the screen output processing unit 304.

The home screen 400 is used by the user to call up the functions of the image forming apparatus 10, and is displayed together with icons for activating the standard functions (e.g., copy, FAX, and send) and applications of the image forming apparatus 10. When the user selects any of these icons, a function indicated by the selected icon operates. When a copy icon 401, a FAX icon 402, and a send icon 403 are selected, setting screens for the copy function, FAX function, and send function are displayed, respectively. When an application icon 404 is selected, an application associated with this icon is activated.

On a lower part of the home screen 400, a status confirmation button 405 is displayed in a selectable manner, and a status display area 406 is provided. When the status confirmation button 405 is selected, a status confirmation screen 700 shown in FIG. 7 for confirming the statuses of the image forming apparatus 10 is displayed. The status display area 406 displays a state of the image forming apparatus 10. When the status confirmation button 405 is selected, the status confirmation screen 700 for confirming the statuses of the image forming apparatus 10 is displayed. Herein, a display area made up of the combination of the status confirmation button 405 and the status display area 406 is referred to as a footer area 407, and is displayed in common on various screens of the image forming apparatus 10 according to the present embodiment. That is to say, the footer area is displayed in common on both of screens of standard functions and screens of other applications. Providing such a footer area enables the user to perform operations without consciously discriminating between the native program, which provides standard functions, and other extension applications, thereby improving UI convenience.

<Sequence Associated with Selection of Standard Function>

Figure 5:
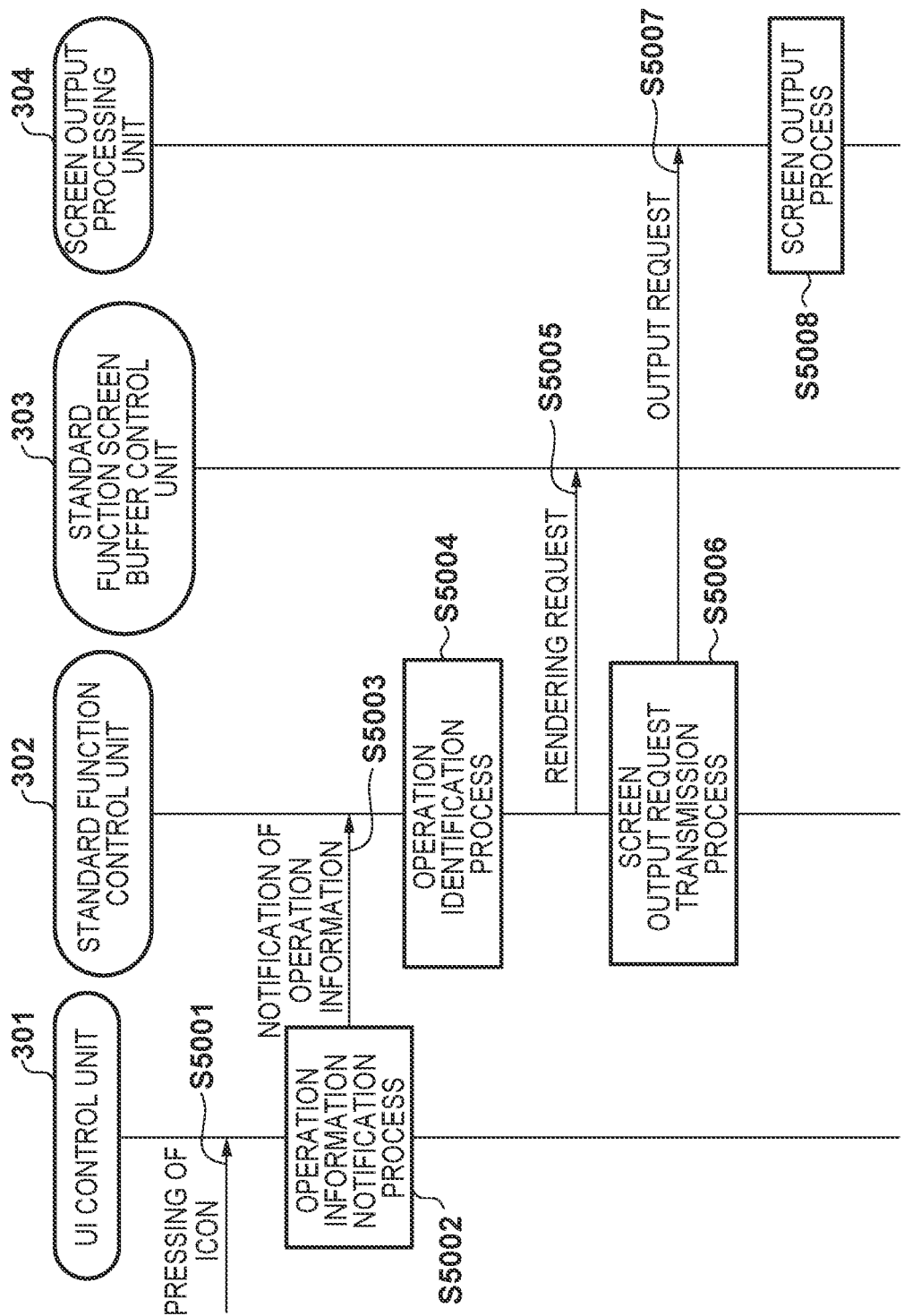
FIG. 5 is a sequence diagram showing processes that are executed until a copy setting screen is displayed in the embodiment.
Figure 6:
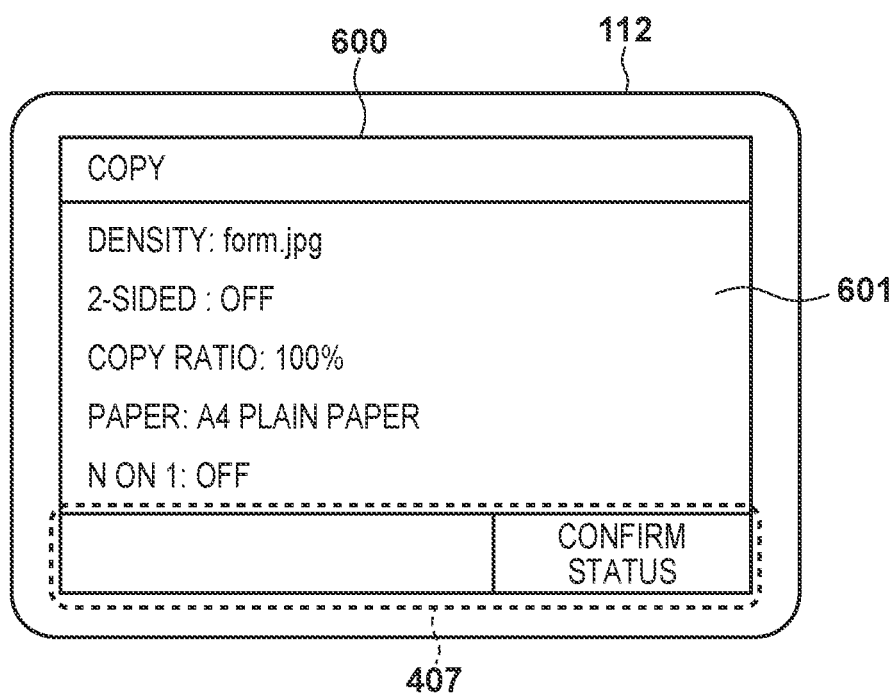
FIG. 6 shows an example of a copy setting screen according to the embodiment.

With reference to FIG. 5, a description is now given of a sequence of processes that are executed when the user has selected the copy icon (standard function) 401 on the home screen 400 shown in FIG. 4, and that are executed until a copy setting screen 600 shown in FIG. 6 is displayed. The following processes are realized, for example, by the CPU 101 reading out programs stored in the ROM 103 and the storage 104 into the RAM 102 and executing the programs.

First, in step S5001, the UI control unit 301 detects a user operation. Subsequently, in step S5002, the UI control unit 301 executes an operation information notification process for deciding on which one of the standard function control unit 302 and the application management unit 305 is to be notified of operation information. It will be assumed here that the standard function control unit 302 is decided on as a notification destination. Furthermore, in step S5003, the UI control unit 301 notifies the standard function control unit 302, which was decided on as the notification destination in the operation information notification process of step S5002, of the operation information.

Next, in step S5004, the standard function control unit 302 executes an operation identification process for identifying what kind of operation was performed based on a screen currently displayed and on the received operation information. Here, the selection of the copy icon 401 is identified. Subsequently, in step S5005, the standard function control unit 302 issues a rendering request to the standard function screen buffer control unit 303 so as to render the copy setting screen 600 shown in FIG. 6. Upon accepting the rendering request, the standard function screen buffer control unit 303 renders the screen.

Next, in step S5006, the standard function control unit 302 executes a screen output request transmission process for transmitting a screen output request so as to display the rendered screen. In step S5007, the standard function control unit 302 issues the output request to the screen output processing unit 304. In step S5008, upon accepting the output request, the screen output processing unit 304 executes a screen output process and outputs the screen to the operation unit 112.

<Copy Setting Screen>

With reference to FIG. 6, a description is now given of the copy setting screen 600 that is displayed on the operation unit 112 when the copy icon 401 shown in FIG. 4 has been selected. The user can use the copy function of the image forming apparatus 10 by operating the copy setting screen 600. Copy settings can be displayed and edited in a copy setting area 601. As shown in FIG. 6, the footer area 407 is displayed on the copy setting screen 600, similarly to the home screen 400 shown in FIG. 4.

<Status Confirmation Screen>

Figure 7:
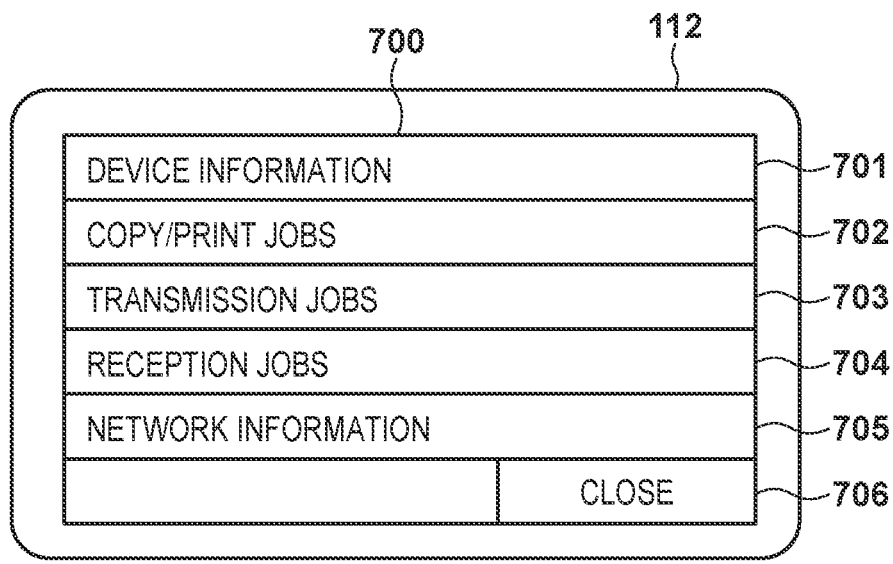
FIG. 7 shows an example of a status confirmation screen according to the embodiment.

With reference to FIG. 7, a description is now given of the status confirmation screen 700 of the image forming apparatus 10, which is displayed on the operation unit 112 when the status confirmation button 405 has been selected. The status confirmation screen 700 displays buttons 701 to 705 for confirming various statuses of the image forming apparatus 10, and the operation unit 112 displays screens for confirming various statuses upon selection of these buttons.

A device information button 701 is intended to display a screen for confirming a serial number and a firmware version of the image forming apparatus 10. A copy/print job button 702 is intended to display the processing statuses and history of copy/print jobs that have been processed in the image forming apparatus 10. A transmission job button 703 is intended to display the processing statuses and history of transmission jobs that have been processed in the image forming apparatus 10. A reception job button 704 is intended to display the processing statuses and history of reception jobs that have been processed in the image forming apparatus 10. A network information button 705 is intended to display a network IP address and network settings of the image forming apparatus 10. A close button 706 is intended to close the status confirmation screen 700 and return to the previous screen.

<Sequence Associated with Selection of Extension Application>

Figure 8:
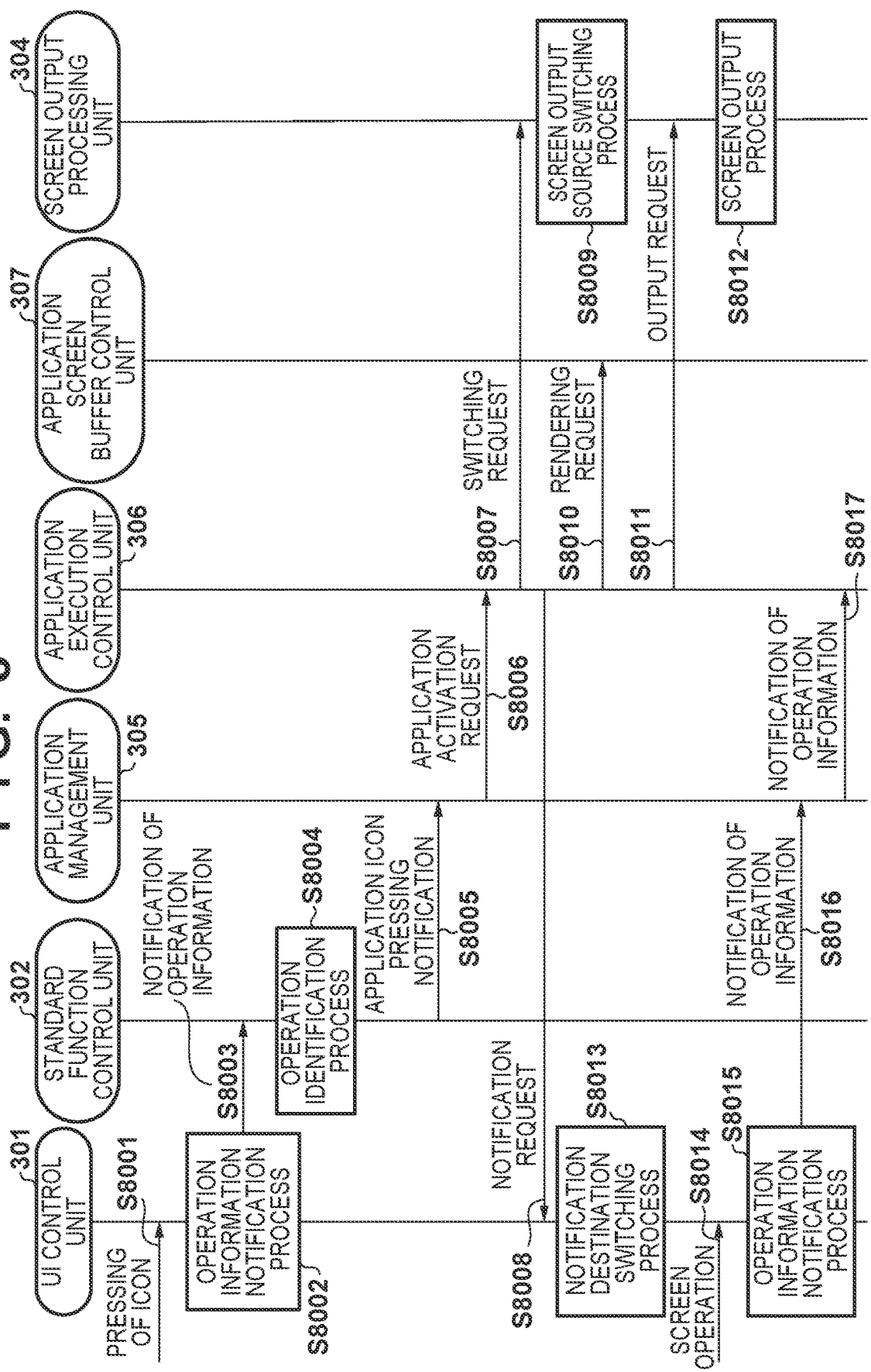
FIG. 8 is a sequence diagram showing processes that are executed to display an operation screen of an application in the embodiment.
Figure 11:
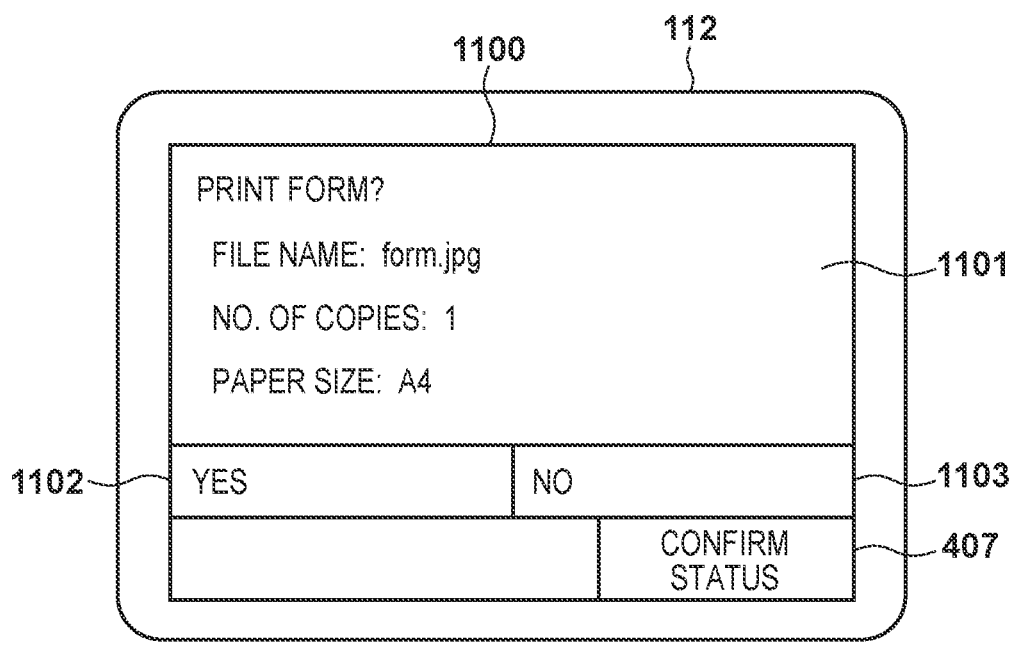
FIG. 11 shows an example of a screen that is displayed by an application in the embodiment.

With reference to FIG. 8, a description is now given of a sequence of processes for activating an application (extension application) upon selection of the application icon 404 shown in FIG. 4, and for displaying an extension application screen 1100 of the application shown in FIG. 11. The following processes are realized, for example, by the CPU 101 reading out programs stored in the ROM 103 and the storage 104 into the RAM 102 and executing the programs.

First, in step S8002, the UI control unit 301 detects a user operation. Subsequently, in step S8002, the UI control unit 301 executes the operation information notification process for deciding on which one of the standard function control unit 302 and the application management unit 305 is to be notified of operation information. It will be assumed here that the standard function control unit 302 is decided on as a notification destination. Furthermore, in step S8003, the UI control unit 301 notifies the standard function control unit 302, which was decided on as the notification destination in the operation information notification process of step S8002, of the operation information.

Next, in step S8004, the standard function control unit 302 executes the operation identification process for identifying what kind of operation was performed based on a screen currently displayed and on the received operation information. Here, the selection of the application icon 404 is identified. Subsequently, in step S8005, the standard function control unit 302 transmits, to the application management unit 305, an application icon pressing notification indicating that the application icon has been selected.

Next, in step S8006, the application management unit 305 issues an application activation request to the application execution control unit 306 so as to activate an application corresponding to the pressed icon. Upon accepting the application activation request, the application execution control unit 306 notifies the screen output processing unit 304 of a switching request so as to display an application screen in step S8007, and notifies the UI control unit 301 of an operation information notification request in step S8008. Upon accepting the operation information notification request, the UI control unit 301 executes a notification destination switching process and switches the notification destination to the application management unit in step S8013.

Meanwhile, in step S8009, upon accepting the switching request, the screen output processing unit 304 executes a screen output source switching process for switching a screen output source to the application screen buffer control unit 307. Thereafter, in step S8010, the application execution control unit 306 issues a rendering request to the application screen buffer control unit 307 so as to render an operation screen of the application. Furthermore, in step S8011, the application execution control unit 306 notifies the screen output processing unit 304 of an output request so as to display the rendered operation screen. Upon accepting the output request, the screen output processing unit 304 executes the screen output process in step S8012.

Next, in step S8014, the UI control unit 301 detects a user operation. Subsequently, in step S8015, the UI control unit 301 executes the operation information notification process for deciding on which one of the standard function control unit 302 and the application management unit 305 is to be notified of operation information. As the notification destination was changed to the application management unit 305 in the notification destination switching process of step S8013, the UI control unit 301 notifies the application management unit 305 of the operation information in step S8016. Thereafter, in step S8017, the application management unit 305 notifies the application execution control unit 306, which is executing the application, of the received operation information. The foregoing processes activate the application, display the operation screen of the application, and notify the application execution control unit 306 of the operation information.

<Operation Information Notification Process>

Figure 9:
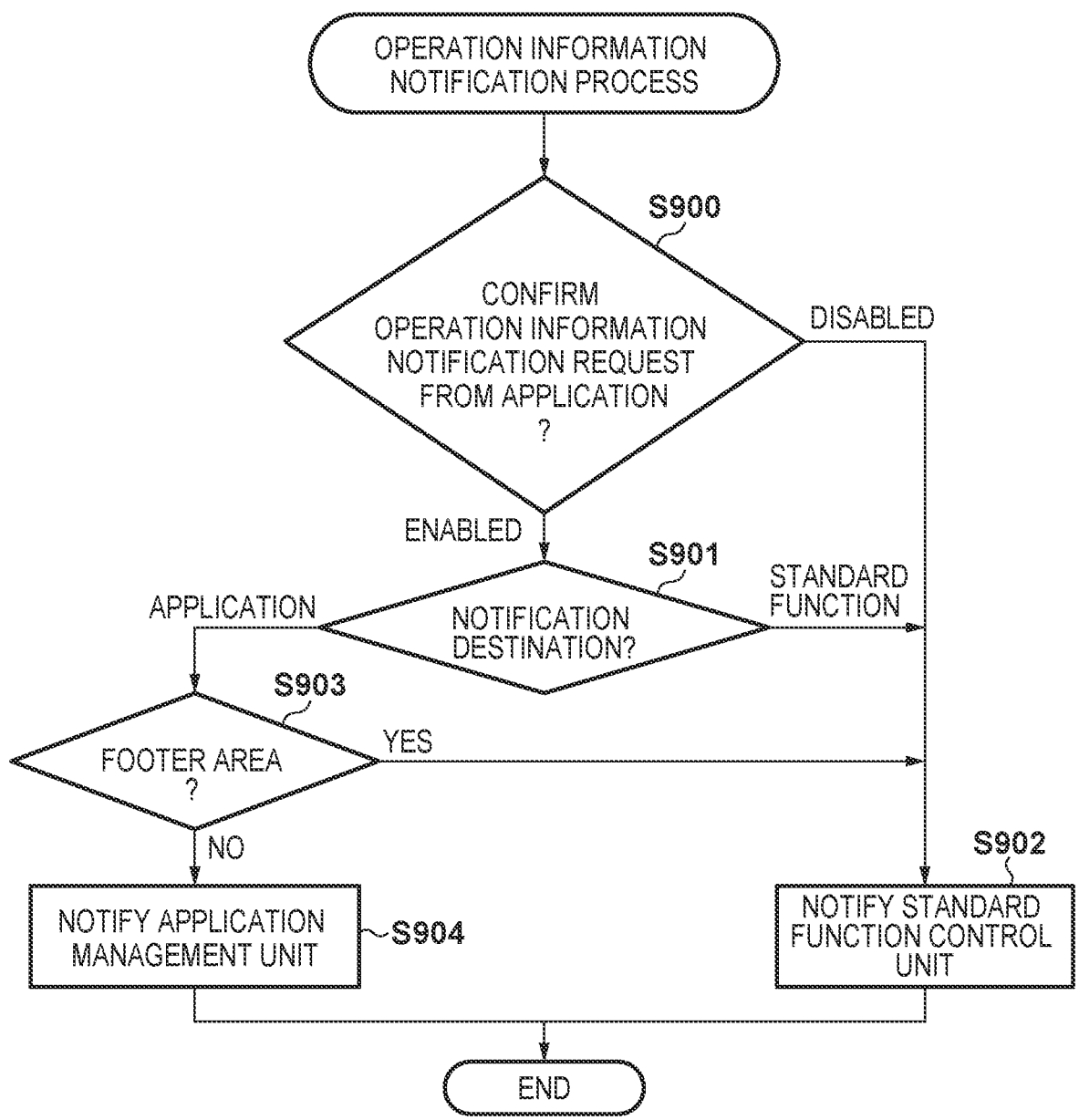
FIG. 9 is a sequence diagram showing an operation information notification process according to the embodiment.
Figure 14:
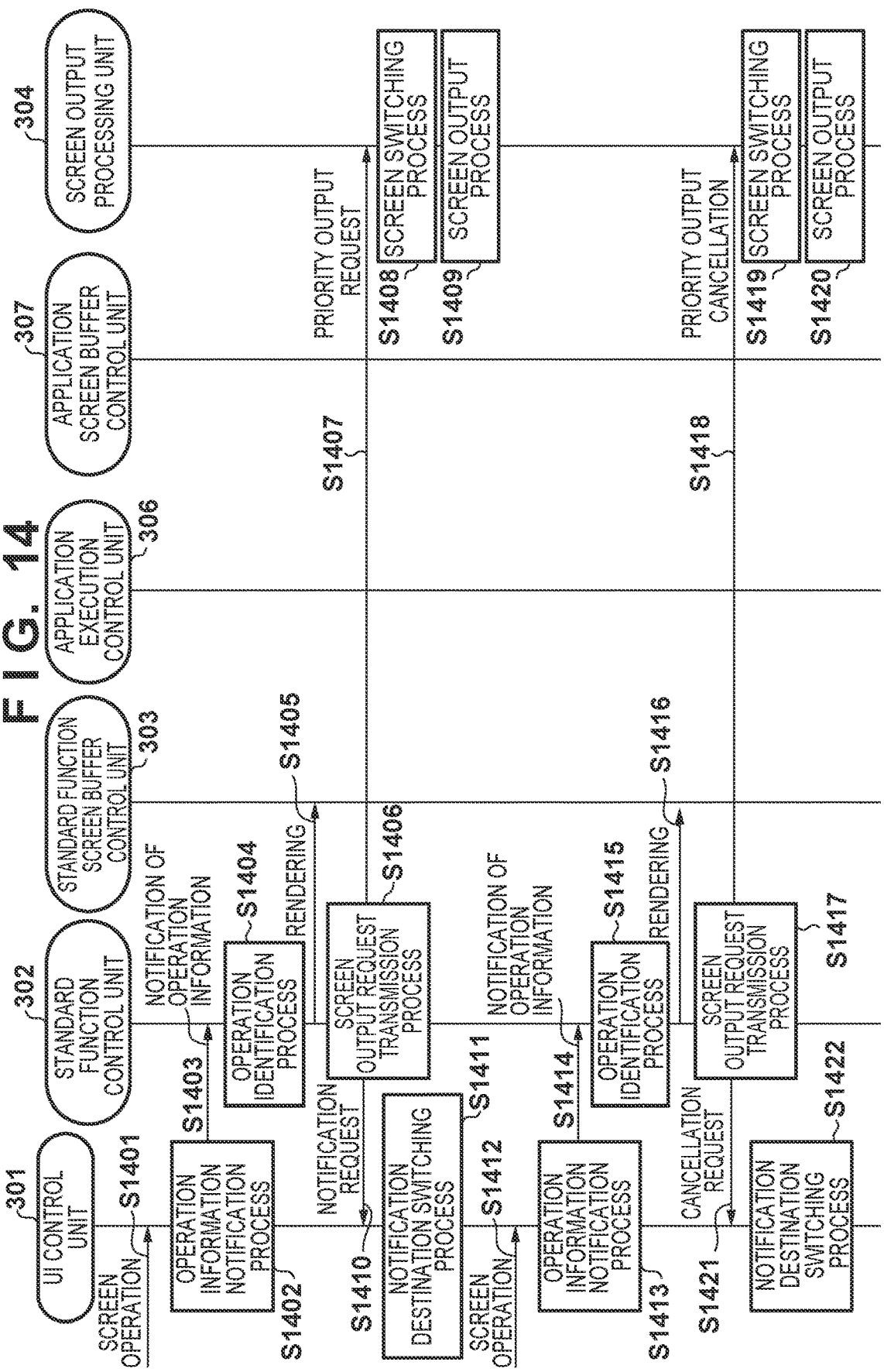
FIG. 14 is a sequence diagram for a case in which a status confirmation button has been selected in the embodiment.

With reference to FIG. 9, a description is now given of a specific process procedure of the operation information notification process (steps S5001, S8002, S8015, S1402, and S1413) shown in FIGS. 5, 8, and 14. The following processes are realized, for example, by the CPU 101 reading out programs stored in the ROM 103 and the storage 104 into the RAM 102 and executing the programs.

First, in step S900, the UI control unit 301 determines whether an operation information notification request from an application is enabled. It proceeds to step S901 if the operation information notification request is enabled, and proceeds to step S902 if the operation information notification request is disabled. In step S901, the UI control unit 301 determines whether a current notification destination of operation information is the application management unit 305 or the standard function control unit 302. It proceeds to step S903 if the notification destination of the operation information from the UI control unit 301 is the application, and proceeds to step S902 if the notification destination is a standard function.

In step S903, the UI control unit 301 determines whether an operated area is the footer area 407. It proceeds to step S902 if the operated area is the footer area 407, and proceeds to step S904 if the operated area is not the footer area 407. In step S904, the UI control unit 301 notifies the application management unit 305 of the operation information, and ends the present process. On the other hand, in step S902, the UI control unit 301 notifies the standard function control unit 302 of the operation information, and ends the present process.

<Screen Output Process>

Figure 10:
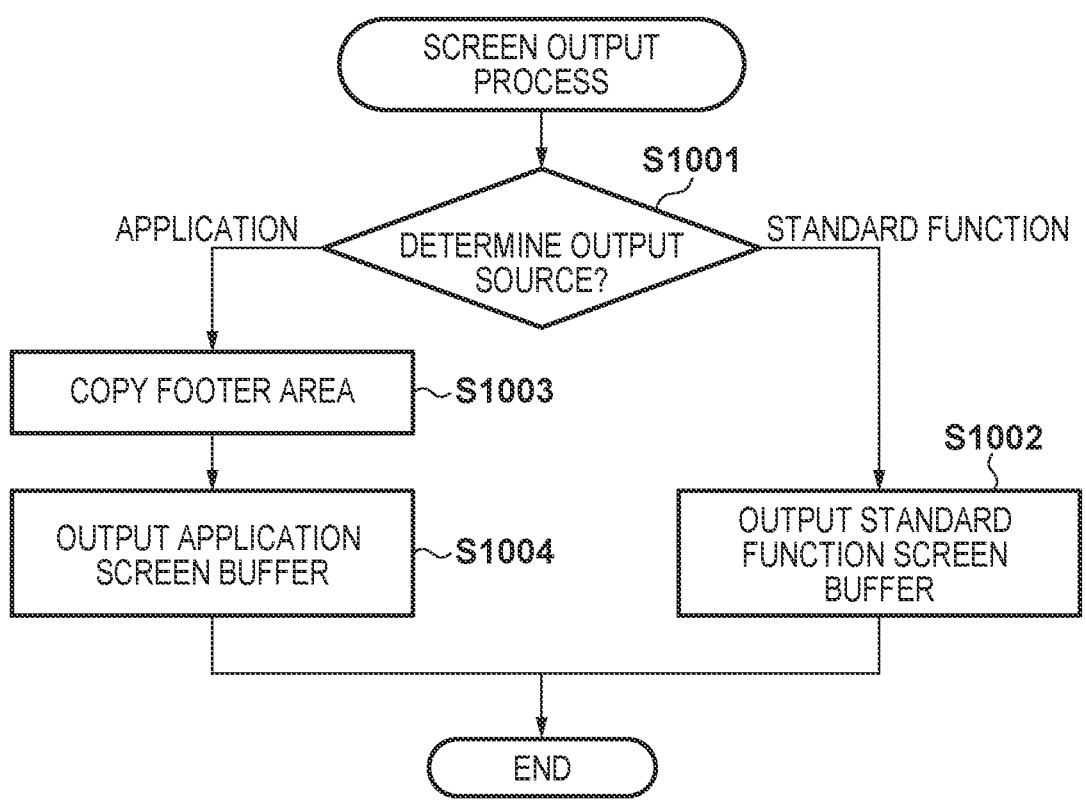
FIG. 10 is a sequence diagram showing a screen output process according to the embodiment.

With reference to FIG. 10, a description is now given of a specific process procedure of the screen output process (steps S5008, S8012, S1204, S1409, and S1420) shown in FIGS. 5, 8, 12, and 14. The following processes are realized, for example, by the CPU 101 reading out programs stored in the ROM 103 and the storage 104 into the RAM 102 and executing the programs.

First, in step S1001, the screen output processing unit 304 determines whether a current output source is an application screen buffer or a standard function screen buffer. It proceeds to step S1003 if the output source is the application screen buffer, and proceeds to step S1002 if the output source is the standard function screen buffer. In step S1002, the screen output processing unit 304 outputs the content of the standard function screen buffer, and ends the present process.

On the other hand, in step S1003, the screen output processing unit 304 copies the footer area 407 in the standard function screen buffer to the application screen buffer, and then proceeds to step S1004. In step S1004, the screen output processing unit 304 outputs the content of the application screen buffer, and ends the present process. The foregoing process enables the footer area 407 of a screen displayed by an application to display the same content as that of a screen displayed by a standard function.

<Extension Application Screen>

With reference to FIG. 11, a description is now given of an example of a screen displayed by an application (extension application). The extension application screen 1100 is rendered by the application operating on the application execution control unit 306 via the application screen buffer control unit 307, and then output to the operation unit 112 by the screen output processing unit 304. The following describes an example in which this screen is an application execution screen for printing a pre-registered image form.

An area 1101 displays print settings of the pre-registered form. A button 1102 confirms execution of printing of this form. A button 1103 confirms cancellation of printing of this form. The screen output processing unit 304 displays the footer area 407 by copying a footer section rendered by the standard function control unit 302. While this screen is being displayed, basically, the application management unit 305 is notified of operation information of a user operation in the operation information notification process (step S5002). Thereafter, the application management unit 305 notifies the application (extension application) executed in the application execution control unit 306 of the operation information. Note that an operation performed on the footer area 407 is notified to the standard function control unit 302 as will be described later in detail.

<Sequence of Screen Output Control>

Figure 12:
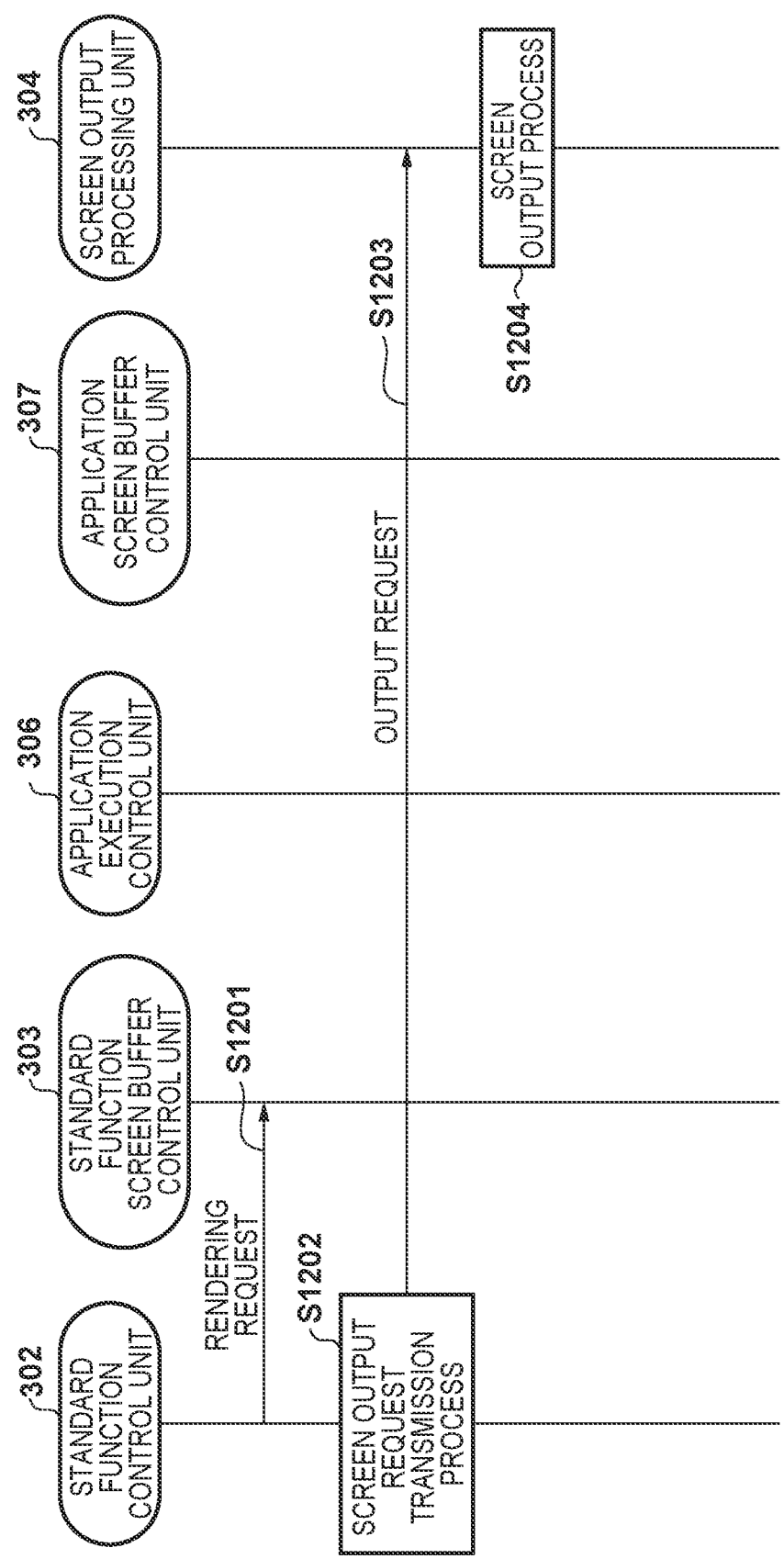
FIG. 12 is a sequence diagram showing screen output control that is performed with respect to a footer area in the embodiment.

With reference to FIG. 12, a description is now given of a sequence of processes for screen output control that is performed with respect to the footer area 407 while the extension application screen 1100 shown in FIG. 11 is being displayed. The following processes are realized, for example, by the CPU 101 reading out programs stored in the ROM 103 and the storage 104 into the RAM 102 and executing the programs.

In step S1201, the standard function control unit 302 monitors a state of the image forming apparatus 10, and if some kind of error occurs, issues a request to render an error message in the status display area 406. Subsequently, in step S1202, the standard function control unit 302 executes the screen output request transmission process so as to display the rendered content. In step S1203, the standard function control unit 302 issues an output request to the screen output processing unit 304 as a part of the screen output request transmission process. Upon accepting the output request, the screen output processing unit 304 executes the screen output process and outputs a screen to the operation unit 112 in step S1204. Specifically, an application screen is output to the operation unit 112 after the footer area 407 in the standard function screen buffer is copied to the application screen buffer control unit 307. As a result of the foregoing processes, an extension application screen 1300 shown in FIG. 13, which includes the updated footer area 407, is displayed.

Figure 13:
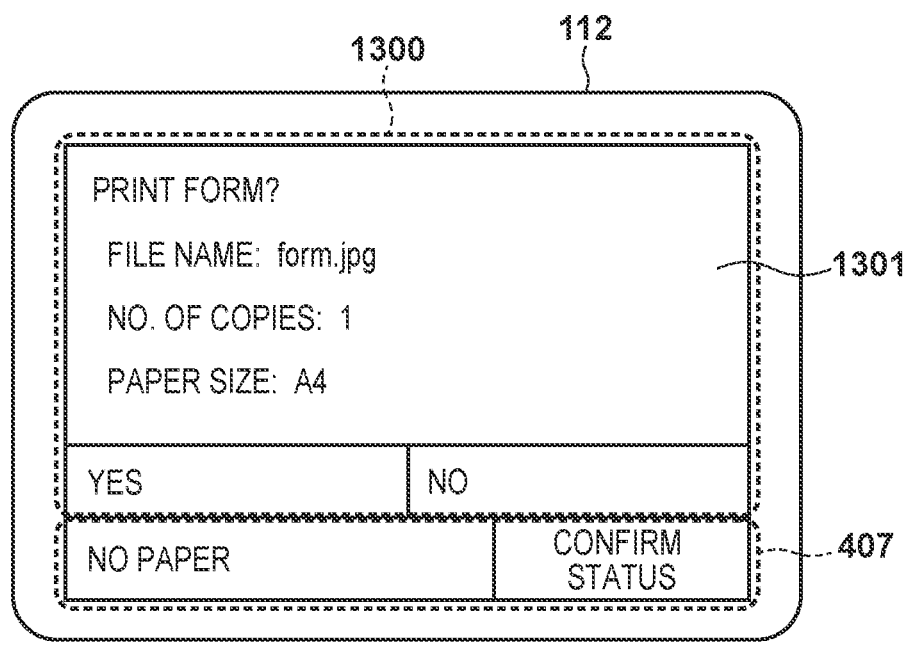
FIG. 13 shows an example of a screen that is displayed by an application in the embodiment.

FIG. 13 shows an example of the extension application screen 1300 that is displayed by performing the screen output control shown in FIG. 12. An area 1301 is rendered by the application execution control unit 306. On the other hand, the footer area 407 is rendered by the standard function control unit 302. The screen output process composites these areas together and displays them on the operation unit 112. That is to say, an image rendered by the native program and an image rendered by an extension application are composited together, and the composite image is output as the extension application screen 1300. As stated earlier, in the present embodiment, operations that are performed on these rendered areas are respectively notified to the applications that rendered these areas.

<Sequence Associated with Selection of Status Confirmation Button>

With reference to FIG. 14, a description is now given of a sequence of processes that are executed when the status confirmation button 405 on the extension application screen 1100 shown in FIG. 11 has been selected. The following processes are realized, for example, by the CPU 101 reading out programs stored in the ROM 103 and the storage 104 into the RAM 102 and executing the programs.

First, in step S1401, the UI control unit 301 detects a screen operation performed by the user. Subsequently, in step S1402, the UI control unit 301 executes the operation information notification process and decides on a notification destination of operation information. In the present case, as the status confirmation button 405 in the footer area 407 was selected (operated), the standard function control unit 302 is decided on as the notification destination in the determination process of step S903. Thereafter, in step S1403, the UI control unit 301 notifies the standard function control unit 302 of the operation information.

In step S1404, the standard function control unit 302 executes the operation identification process for identifying what kind of operation was performed based on a screen currently displayed and on the received operation information. Here, the selection of the status confirmation button 405 is identified. Subsequently, in step S1405, the standard function control unit 302 renders the status confirmation screen 700 shown in FIG. 7 as the status confirmation button 405 was selected. Thereafter, in step S1406, the standard function control unit 302 executes the screen output request transmission process so as to display the screen. Then, in step S1407, the standard function control unit 302 notifies the screen output processing unit 304 of a priority output request. The details of the screen output request transmission process will be described later using FIG. 15.

In step S1408, upon accepting the priority output request, the screen output processing unit 304 executes a screen switching process for temporarily switching a screen output source to the standard function screen buffer so as to output the content of the standard function screen buffer in priority to the content of the application screen buffer. Subsequently, in step S1409, the screen output processing unit 304 executes the screen output process so as to display the screen that was decided on by the screen switching process. As a result of this process, display of the screen shown in FIG. 11 is switched to display of the screen shown in FIG. 7.

Furthermore, in step S1410, the standard function control unit 302 transmits an operation information notification request to the UI control unit 301 so that the next operation information is transmitted to the standard function control unit 302. In step S1411, upon accepting the operation information notification request, the UI control unit 301 executes the notification destination switching process and switches the notification destination of the operation information to the standard function control unit 302.

Next, in step S1412, if the user selects the close button 706, the UI control unit 301 detects a screen operation. Subsequently, in step S1413, the UI control unit 301 executes the operation information notification process and decides on the notification destination of the operation information. Here, as the notification destination was switched to the standard function control unit 302 in step S1411, the UI control unit 301 notifies the standard function control unit 302 of the operation information in step S1414.

In step S1415, the standard function control unit 302 executes the operation identification process for identifying what kind of operation was performed based on a screen currently displayed and on the received operation information. Here, the selection of the close button 706 is identified. Subsequently, in step S1416, the standard function control unit 302 renders the home screen 400 shown in FIG. 4 as the close button 706 was selected. In step S1417, the standard function control unit 302 executes the screen output request transmission process so as to display the screen. Then, the standard function control unit 302 transmits, to the screen output processing unit 304, priority output cancellation for cancelling the priority output in step S1418, and transmits an operation information notification cancellation request to the UI control unit 301 in step S1421. The details of the screen output request transmission process will be described later using FIG. 15.

Upon accepting the priority output cancellation, the screen output processing unit 304 executes the screen switching process and switches the screen output source back to the application screen buffer in step S1419. Subsequently, in step S1420, the screen output processing unit 304 executes the screen output process so as to display the extension application screen 1100 shown in FIG. 11 on the operation unit 112.

Furthermore, upon accepting the operation information notification cancellation request, the standard function control unit 302 executes the notification destination switching process and switches the notification destination of the operation information to the application management unit 305, that is to say, an extension application, in step S1422.

As described above, on the occurrence of a screen transition by the standard function control unit 302 upon detection of an operation on the footer area 407 of the extension application screen, an appropriate screen (a native program screen) can be displayed as a result of display switching. Furthermore, the user can return to the previous extension application screen by performing an operation to return to the previous extension application screen on the native program screen.

<Screen Output Request Transmission Process>

Figure 15:
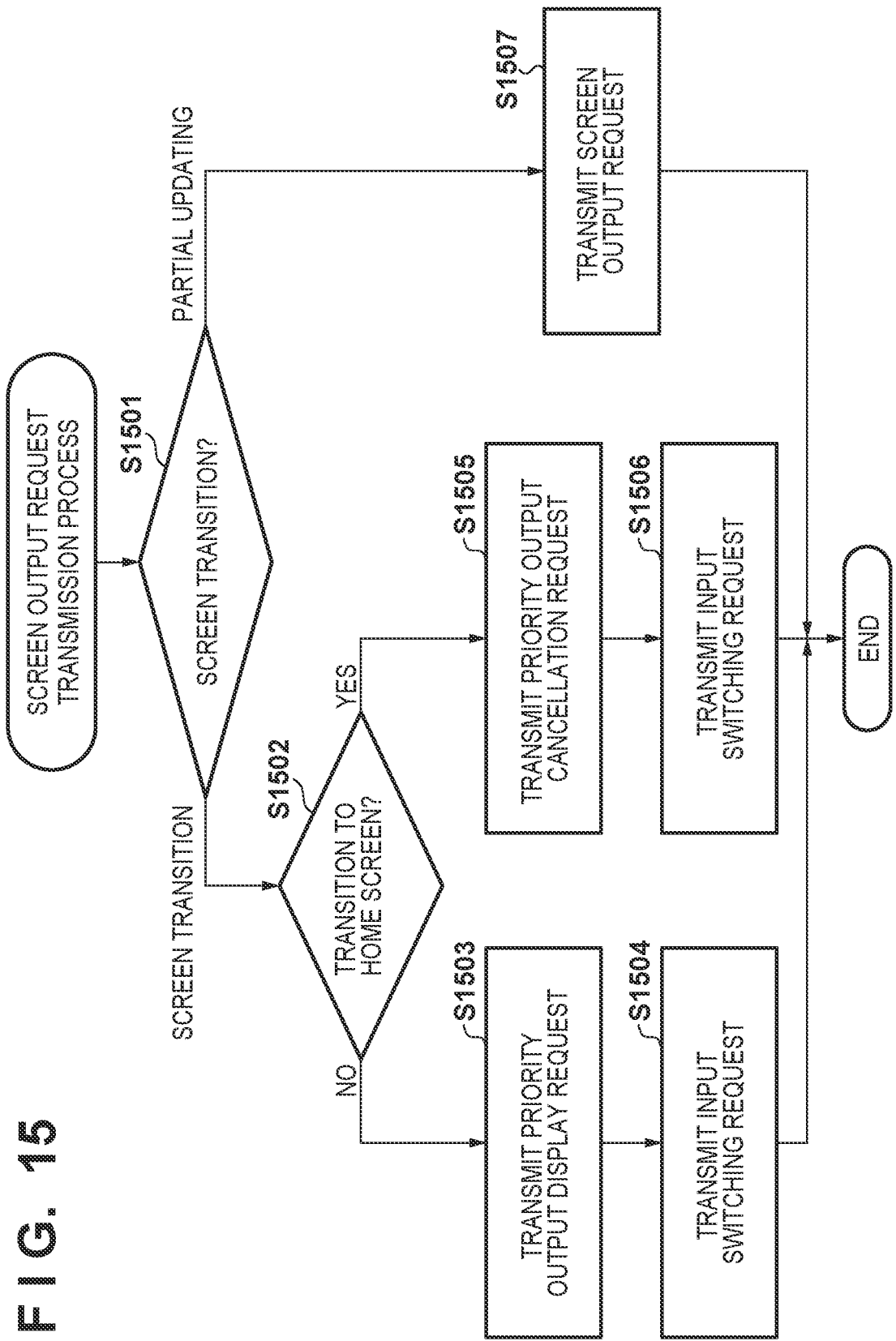
FIG. 15 is a sequence diagram showing a screen output request transmission process according to the embodiment.

With reference to FIG. 15, a description is now given of a specific process procedure of the screen output request transmission process (steps S5006, S1202, S1406, and S1417) shown in FIGS. 5, 12, and 14. The following processes are realized, for example, by the CPU 101 reading out programs stored in the ROM 103 and the storage 104 into the RAM 102 and executing the programs.

First, in step S1501, the standard function control unit 302 determines whether a screen to be output is attributed to a screen transition or partial updating of a screen. It proceeds to step S1502 if the screen to be output is attributed to the screen transition, and proceeds to step S1507 if the screen to be output is attributed to partial updating. In step S1502, the standard function control unit 302 determines whether the type of the screen transition is a transition to the home screen 400. It proceeds to step S1505 if the type is the transition to the home screen 400, and proceeds to step S1503 if the type is not the transition to the home screen 400.

In step S1503, the standard function control unit 302 transmits a priority output display request so that the screen output processing unit 304 displays the standard function screen buffer. Subsequently, in step S1504, the standard function control unit 302 transmits an input switching request to the UI control unit 301 so as to make the standard function control unit 302 a notification destination of operation information from the UI control unit 301, and ends the present process.

On the other hand, in step S1505, the standard function control unit 302 transmits a priority output cancellation request to the screen output processing unit 304 so that the application screen buffer is displayed during execution of an application. Subsequently, in step S1506, the standard function control unit 302 transmits an input switching request to the UI control unit 301 so that the application is notified of operation information during execution of the application, and ends the present process.

In step S1507, the standard function control unit 302 transmits a screen output request to the screen output processing unit 304 so as to update a displayed screen, and ends the present process. Execution of the process of the present flowchart enables switching between displayed screens and switching between notification destinations of operation information depending on the situation.

<Notification Destination Switching Process>

Figure 16:
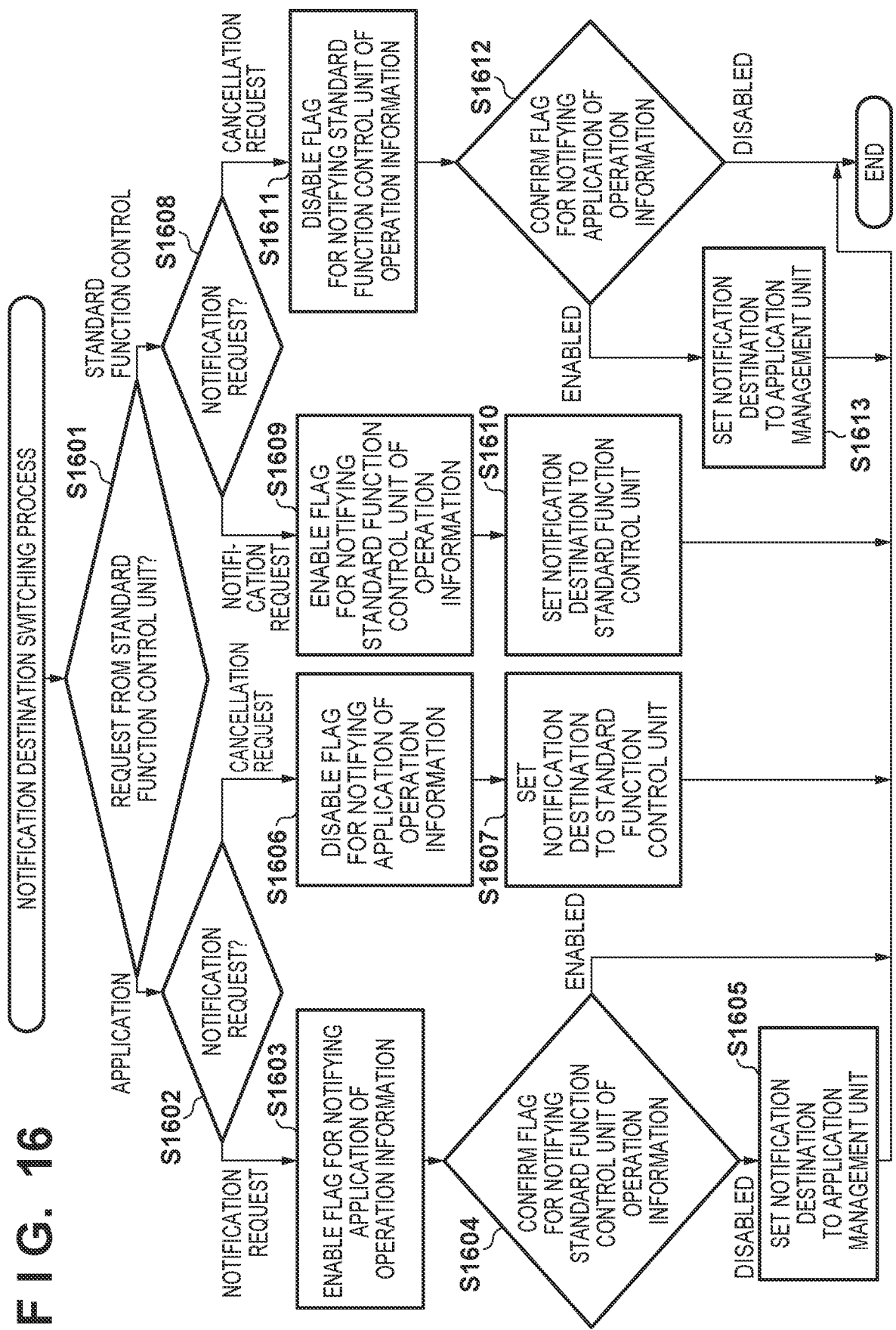
FIG. 16 is a sequence diagram showing a notification destination switching process according to the embodiment.

With reference to FIG. 16, a description is now given of a specific process procedure of the notification destination switching process (steps S8013, S1411, and S1422) shown in FIGS. 8 and 14. The following processes are realized, for example, by the CPU 101 reading out programs stored in the ROM 103 and the storage 104 into the RAM 102 and executing the programs.

First, in step S1601, the UI control unit 301 determines whether a request source of the switching process is the standard function control unit 302 (native program) or the application execution control unit 306 (extension application). It proceeds to step S1608 if the request source of the switching process is the standard function control unit 302, and proceeds to step S1602 if the request source is the application execution control unit 306.

In step S1602, the UI control unit 301 determines whether the request for the switching process is a notification request or a cancellation request. It proceeds to step S1603 if the request is the notification request, and proceeds to step S1606 if the request is the cancellation request. In step S1603, the UI control unit 301 enables a flag for notifying the application of operation information. This flag is disabled in a default state. Subsequently, in step S1604, the UI control unit 301 confirms a flag for notifying the standard function control unit 302 of the operation information. It ends the present process if the flag is enabled, and proceeds to step S1605 if the flag is disabled. In step S1605, the UI control unit 301 sets a notification destination of the operation information to the application management unit 305, and then ends the present process. Note that the notification destination of the operation information is set to the standard function control unit 302 in a default state.

On the other hand, in step S1606, the UI control unit 301 disables the flag for notifying the application of the operation information. Subsequently, in step S1607, the UI control unit 301 sets the notification destination of the operation information to the standard function control unit 302, and then ends the present process.

In step S1608, the UI control unit 301 determines whether the switching request is the notification request or the cancellation request, similarly to step S1602. It proceeds to step S1609 if the switching request is the notification request, and proceeds to step S1611 if the switching request is the cancellation request. In step S1609, the UI control unit 301 enables the flag for notifying the standard function control unit 302 of the operation information. This flag is disabled in a default state. Subsequently, in step S1610, the UI control unit 301 sets the notification destination of the operation information to the standard function control unit 302, and then ends the present process.

On the other hand, in step S1611, the UI control unit 301 disables the flag for notifying the standard function control unit 302 of the operation information. Subsequently, in step S1612, the UI control unit 301 confirms the setting state of the flag for notifying the application of the operation information. It proceeds to step S1613 if the flag is enabled, and ends the present process if the flag is disabled. In step S1613, the UI control unit 301 sets the notification destination of the operation information to the application management unit 305, and then ends the present process. By executing the process of the present flowchart, the notification destination of the operation information can be switched between the application management unit 305 and the standard function control unit 302 depending on the situation.

<Image Output Source Switching Process>

Figure 17:
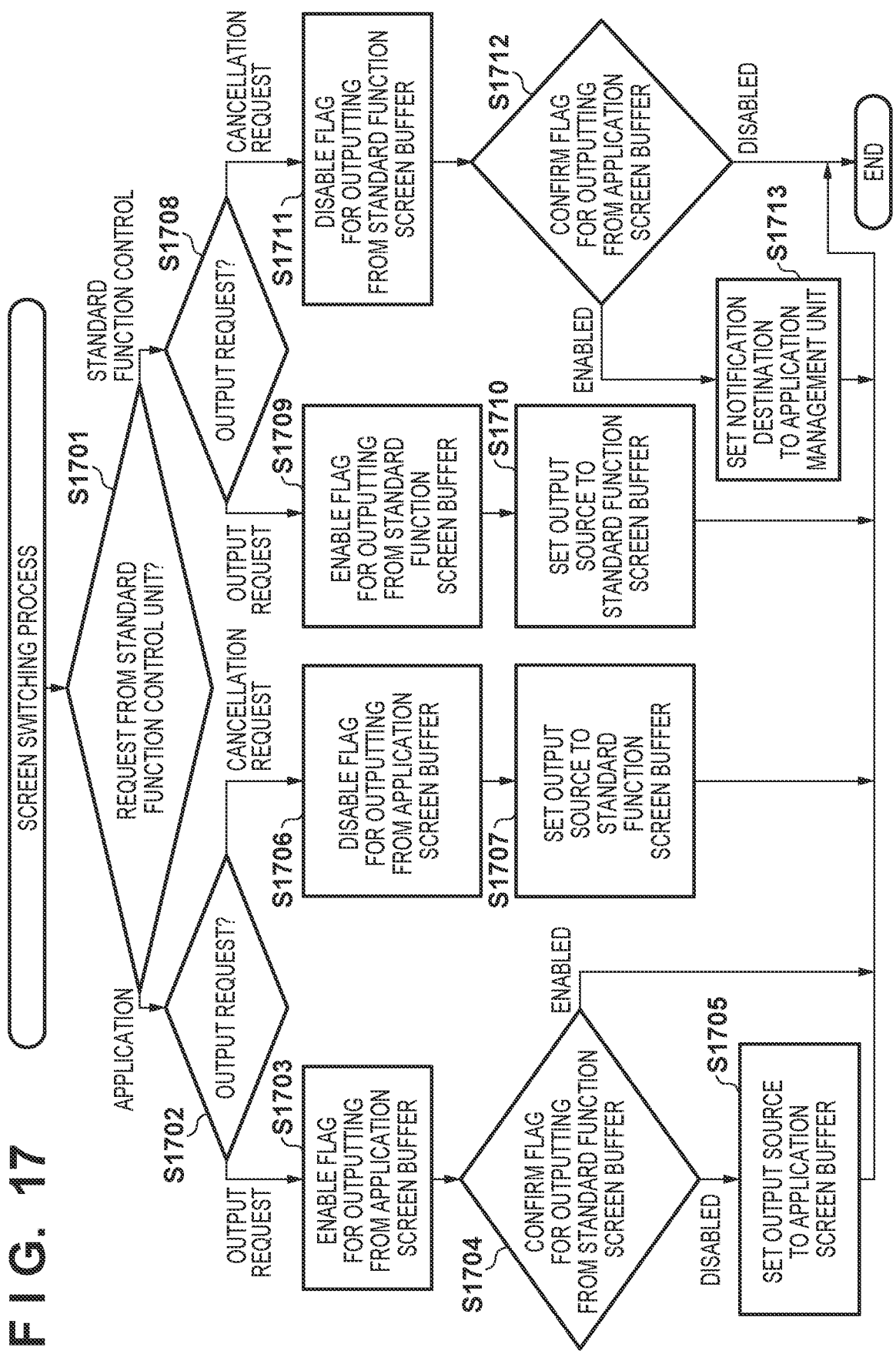
FIG. 17 is a sequence diagram showing a screen output source switching process according to the embodiment.

With reference to FIG. 17, a description is now given of a specific process procedure of the screen output source switching process (steps S8009 and S1802) shown in FIGS. 8 and 18. The following processes are realized, for example, by the CPU 101 reading out programs stored in the ROM 103 and the storage 104 into the RAM 102 and executing the programs.

First, in step S1701, the screen output processing unit 304 determines whether a request source of screen output source switching is the standard function control unit 302 (native program) or the application execution control unit 306 (extension application). It proceeds to step S1708 if the request source is the standard function control unit 302, and proceeds to step S1702 if the request source is the application execution control unit 306.

In step S1702, the screen output processing unit 304 determines whether the type of the request for screen output source switching is an output request or a cancellation request. It proceeds to step S1703 if the request is the output request, and proceeds to step S1706 if the request is the cancellation request. In step S1703, the screen output processing unit 304 enables a flag for outputting from the application screen buffer. This flag is disabled in a default state. Subsequently, in step S1704, the screen output processing unit 304 confirms a flag for outputting from the standard function screen buffer. It ends the present process if the flag is enabled, and proceeds to step S1705 if the flag is disabled. In step S1705, the screen output processing unit 304 sets the output source to the application screen buffer, and ends the present process. This output source is set to the standard function screen buffer in a default state.

On the other hand, in step S1706, the screen output processing unit 304 disables the flag for outputting from the application screen buffer. Subsequently, in step S1707, the screen output processing unit 304 sets the output source to the standard function screen buffer, and then ends the present process.

In step S1708, the screen output processing unit 304 determines whether the request for screen output source switching is the output request or the cancellation request, similarly to step S1702. It proceeds to step S1709 if the request is the output request, and proceeds to step S1711 if the request is the cancellation request. In step S1709, the screen output processing unit 304 enables the flag for outputting from the standard function screen buffer. This flag is disabled in a default state. Subsequently, in step S1710, the screen output processing unit 304 sets the output source to the standard function screen buffer, and then ends the present process.

On the other hand, in step S1711, the screen output processing unit 304 disables the flag for outputting from the standard function screen buffer. Subsequently, in step S1712, the screen output processing unit 304 confirms the setting state of the flag for outputting from the application screen buffer. It proceeds to step S1713 if the flag is enabled, and ends the present process if the flag is disabled. In step S1713, the screen output processing unit 304 sets the notification destination of the operation information to the application management unit 305, and then ends the present process. By executing the process of the present flowchart, a screen to be output can be switched between an application screen and a standard function screen depending on the situation.

<Sequence Associated with Ending of Application>

With reference to FIG. 18, a description is now given of a sequence of processes that are executed when an application is ended in the present embodiment. The following processes are realized, for example, by the CPU 101 reading out programs stored in the ROM 103 and the storage 104 into the RAM 102 and executing the programs.

When an application is ended, the application execution control unit 306 issues an output cancellation request to the screen output processing unit 304 in step S1801. The application execution control unit 306 also issues an operation information notification cancellation request to the UI control unit 301 in step S1804, and issues an end notification to the application management unit 305 in step S1805.

In step S1802, upon accepting the output cancellation request, the screen output processing unit 304 executes the screen output source switching process. As a result of this process, a screen output source is switched to the standard function screen buffer. Subsequently, in step S1803, the screen output processing unit 304 executes the screen output process and displays the previous screen.

Meanwhile, upon accepting the operation information notification cancellation request, the UI control unit 301 executes the notification destination switching process in step S1806. As a result of this process, the notification destination of operation information is switched to the standard function control unit 302. Thereafter, in step S1807, the UI control unit 301 detects a screen operation performed by the user. Upon detecting the operation, the UI control unit 301 executes the operation information notification process in step S1808, and notifies the standard function control unit 302 of operation information in step S1809. By executing the foregoing sequence of processes, a displayed screen is switched to a standard function control screen and standard function control can receive operation information when an application is ended. That is to say, the user can perform operations without paying attention to switching between the native program and an extension application.

As described above, the present image forming apparatus includes the standard function screen buffer control unit 303 that renders an operation screen of a standard function, and the application screen buffer control unit 307 that renders an operation screen of an expanded function. Furthermore, the present image forming apparatus outputs an operation screen rendered by the standard function screen buffer control unit 303 or the application screen buffer control unit 307. At this time, in outputting an operation screen rendered by the application screen buffer control unit 307, that is to say, an operation screen of an expanded function, a certain part of an operation screen of a standard function (e.g., a footer area) is set in the output operation screen of the expanded function. The certain part of the operation screen of the standard function is, for example, a footer area that displays a state of the image forming apparatus. When an operation is performed on the certain part of the operation screen, operation information of the operation is notified to the standard function control unit 302. On the other hand, when an operation is performed in an area of the operation screen other than the certain part, operation information of the operation is transmitted to the application management unit 305. Accordingly, the present embodiment can reliably provide convenience to users by enabling favorable coexistence of a UI that operates standard functions and a UI that operates expanded functions while reducing consumption of limited resources of the image forming apparatus. Note that as the standard function control unit 302 performs a major part of the above-described control, extension applications can be designed and developed without taking complicated screen control into consideration.

One of the aspects of the embodiment enables realization of a mechanism that reliably provides convenience to users by enabling favorable coexistence of a UI that operates standard functions and a UI that operates expanded functions while reducing consumption of limited resources of the image forming apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-156859 on Aug. 9, 2016, which is hereby incorporated by reference herein in its entirety.

What is claimed is:
1. An image forming apparatus, comprising:
a display;
one or more memories; and
one or more processors, wherein the one or more memories and the one or more processors cooperate to provide:
a control unit configured to control a native program of the image forming apparatus and an extension application that is different from the native program;
a first memory area in which a screen of the native program is rendered;
a second memory area in which a screen of the extension application is rendered;
a copy unit configured to copy a screen rendered in the first memory area to the second memory area; and
an output unit configured to output the screen of the extension application and the copied screen,
wherein the control unit requests the output unit to output the screen rendered in the first memory area upon accepting an operation accompanying a screen transition via the copied screen output by the output unit.

2. The image forming apparatus according to claim 1, wherein when outputting the screen copied to the second memory area, the output unit outputs the copied screen in such a manner that the copied screen is set in the screen of the extension application.

3. The image forming apparatus according to claim 2, further comprising a notification unit configured to, upon accepting a user operation via the screen being output, notify the control unit of operation information based on the screen being output.

4. The image forming apparatus according to claim 3, wherein when operation information of which the control unit is notified by the notification unit after the notification of the priority output request indicates an operation for making a transition to a previous screen, the control unit issues a request for cancellation of the priority output request to the output unit.

5. The image forming apparatus according to claim 3, wherein when the screen of the native program is being output, if the operation information of which the control unit has been notified by the notification unit indicates that the user operation is for activating the extension application, the control unit notifies the output unit of a switching request for requesting that the screen rendered in the second memory area be output.

6. The image forming apparatus according to claim 5, wherein when the extension application is ended after the notification of the switching request, the control unit issues a request for cancellation of the switching request to the output unit.

7. The image forming apparatus according to claim 1, wherein a button for making a transition to a status confirmation screen is displayed in the copied screen in a selectable manner, the status confirmation screen displaying specifics of the state of the image forming apparatus.

8. The image forming apparatus according to claim 1, wherein the copied screen rendered in the first memory area is a footer area.

9. The image forming apparatus according to claim 1, wherein the screen rendered in the first memory area is displayed in accordance with selection of a status confirmation button included in the copied screen outputted by the output unit.

10. An image forming apparatus, comprising:
a display;
one or more memories; and
one or more processors, wherein the one or more memories and the one or more processors cooperate to provide:
a control unit configured to control a native program of the image forming apparatus and an extension application that is different from the native program;
a first memory area in which a screen of the native program is rendered;
a second memory area in which a screen of the extension application is rendered;
a copy unit configured to copy a screen rendered in the first memory area to the second memory area; and
an output unit configured to output the screen of the extension application and the copied screen,
wherein the control unit requests the output unit to write an updated screen to the first memory area upon accepting an operation accompanying updating the screen of the native program via the copied screen output by the output unit.

11. A control method for an image forming apparatus that includes a display, and a control unit configured to control a native program of the image forming apparatus and an extension application that is different from the native program, the control method comprising:
rendering, in a first memory area, a screen of the native program;
rendering, in a second memory area, a screen of the extension application;
copying a screen rendered in the first memory area to the second memory area, and
outputting the screen of the extension application and the copied screen,
wherein the control unit requests the output unit to output the screen rendered in the first memory area upon accepting an operation accompanying a screen transition via the copied screen output by the output unit.

12. A non-transitory computer-readable storage medium storing a computer program for causing a computer to execute processes of a control method for an image forming apparatus that includes a display, and a control unit configured to control a native program of the image forming apparatus and an extension application that is different from the native program, the control method comprising:
rendering, in a first memory area, a screen of the native program;
rendering, in a second memory area, a screen of the extension application;
copying a screen rendered in the first memory area to the second memory area, and
outputting the screen of the extension application and the copied screen,
wherein the control unit requests the output unit to output the screen rendered in the first memory area upon accepting an operation accompanying a screen transition via the copied screen output by the output unit.

* * * * *